(12) United States Patent
Yoshioka et al.

(10) Patent No.: US 7,249,039 B2
(45) Date of Patent: Jul. 24, 2007

(54) PROCESSING SYSTEM FOR PROVIDING SERVICES AND PROCESSING METHOD THEREFOR

(75) Inventors: Tatsuo Yoshioka, Ichikawa (JP); Akio Ito, Suginami (JP); Atsuya Toyama, Kashiwa (JP)

(73) Assignee: Hitachi, Ltd., Tokyo (JP)

( * ) Notice: Subject to any disclaimer, the term of this patent is extended or adjusted under 35 U.S.C. 154(b) by 1103 days.

(21) Appl. No.: 09/725,242

(22) Filed: Nov. 29, 2000

(65) Prior Publication Data

US 2002/0004730 A1 Jan. 10, 2002

(30) Foreign Application Priority Data

Jul. 6, 2000 (JP) ............................. 2000-205783

(51) Int. Cl.
*G06Q 40/00* (2006.01)
(52) U.S. Cl. ............................. 705/4; 705/26; 342/457
(58) Field of Classification Search .................... 705/1, 705/5, 6, 13, 14, 26, 4; 342/457
See application file for complete search history.

(56) References Cited

U.S. PATENT DOCUMENTS

| 4,831,526 | A | * | 5/1989 | Luchs et al. ................... 705/4 |
| 6,098,101 | A | * | 8/2000 | Sears ......................... 709/224 |
| 6,259,405 | B1 | * | 7/2001 | Stewart et al. .............. 342/457 |
| 6,609,114 | B1 | * | 8/2003 | Gressel et al. ................ 705/50 |
| 6,609,658 | B1 | * | 8/2003 | Sehr ........................... 235/384 |
| 2002/0016655 | A1 | * | 2/2002 | Joao ........................... 701/35 |
| 2005/0165661 | A1 | * | 7/2005 | Joseph ........................ 705/26 |

* cited by examiner

*Primary Examiner*—Andrew Joseph Rudy
*Assistant Examiner*—Vanel Frenel
(74) *Attorney, Agent, or Firm*—Mattingly, Stanger, Malur & Brundidge, P.C.

(57) ABSTRACT

In a system wherein, a point value is set as a consideration for a service to be offered, a point value to be received as a consideration when a service is given is informed to a service user who desires to receive the service and when the service has been offered, the service provider receives the point value from the service user as the consideration of the service offering, thereby, a service providing system or a processing method of providing services is realized which can provides services more easily to service users.

3 Claims, 15 Drawing Sheets

FIG. 9

| | COLUMN 686 | COLUMN 688 | COLUMN 690 | COLUMN 692 | COLUMN 694 |
|---|---|---|---|---|---|
| | DATA | ITEM | POINTS GIVEN | POINT USED | POINTS REMAIN |
| ROW 672 | H12. 1.10 | | | | 2,200 |
| ROW 674 | H12. 1.10 | PURCHASE POINTS | 1,000 | | 3,200 |
| ROW 676 | H12. 1.15 | CAR LEASING FEE | | 800 | 2,400 |
| ROW 678 | H12. 1.16 | PURCHASE TWO PIECES OF MUSIC | | 10 | 2,390 |
| ROW 680 | H12. 1.20 | MAP PURCHASE | | 100 | 2,290 |
| ROW 682 | H12. 2.10 | PURCHASE POINT | 1,000 | | 3,290 |
| | . . . | | | | |

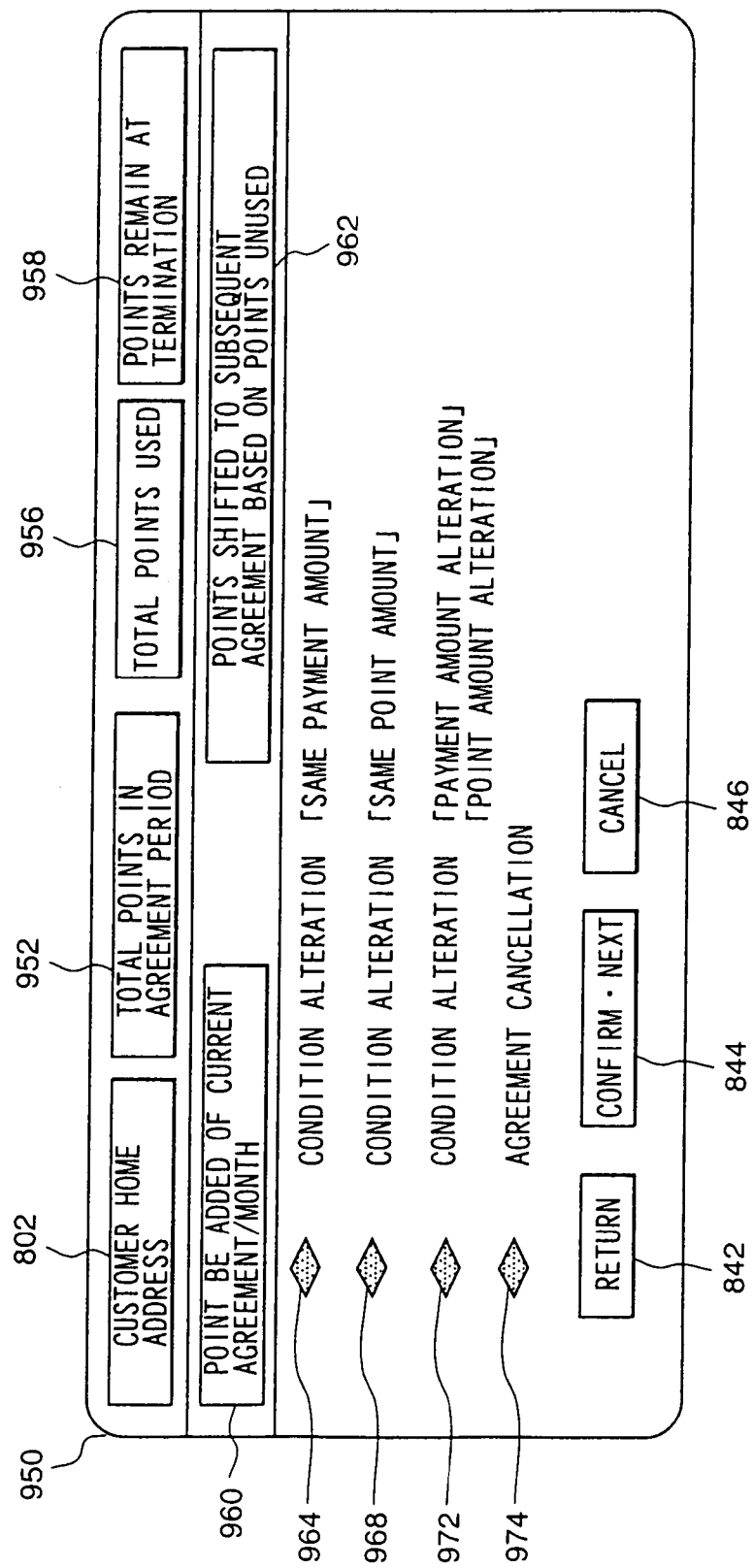

PROCESSING SYSTEM FOR PROVIDING SERVICES AND PROCESSING METHOD THEREFOR

BACKGROUND OF THE INVENTION

The present invention relates to a service providing system, through which services are provided to service users, and to a processing method of providing services to service users.

When a user receives, for example, a specific car lease and car insurance, the user has to pay a consideration to a service provider every time the user receives the service. When a user desires to receive a plurality of services, the user has to apply for such services to respective service providers, and has to pay the required considerations to the respective service providers for the services that are received. Further, when a user wants to modify the contents of a service contract or agreement, the modification is sometime difficult.

A typical user has been looking forward to a way of obtaining desired services more easily and freely.

SUMMARY OF THE INVENTION

An object of the present invention is to provide a service providing system and a processing method of providing services which makes it possible to provide services more easily to service users.

According to one aspect of the present invention, a point value is set as a consideration for a service to be offered. Then, a point value to be received as a consideration when a service is given is communicated to a service user who desires to receive the service, and when the service has been provided, the service provider receives the point value from the service user as consideration for the service.

According to another aspect of the present invention, in a processing system in which service point values depending on insurance policy coverage are communicated to a service user who desires to take out insurance, point values to be paid for the insurance are set with respect to the insurance coverage provided by the policy the and period and times during which the policy is in effect. If the service user accepts the offer, the point value credited to the service user who receives the insurance coverage is reduced depending on the policy accepted by the service user who desires to receive the insurance coverage. In this regard, point values with respect. to a plurality of items of insurance coverage and a service period and times are transmitted in response to a request by the service user who receives the insurance offering and an arithmetic processing of the point value of the service user who receives the insurance coverage is performed.

According to still another aspect of the present invention, a processing for concluding agreements for service from a plurality of service providers which offer services is performed, applications from users who desire services are received, necessary personal data of the possible user or applicant are recorded and a registration processing of the service user is performed. Then, a processing for receiving a lump-sum or periodic use fee from the user applicant is performed, and a point card is issued to the user or applicant in which the personal data of the user or applicant and a point value corresponding to the received use fee are recorded. In response to a car lease application from a service user, a processing for collectively presenting various types of cars to the user is performed, and, at the same time or after the car type presentation, point values with regard to a use period for every car type is communicated to the applicant. When a car lease application is presented by the applicant in which a car type is specified which the service user desires to lease among the presented car types and a lease period of the car is selected, the service provider is requested to provide the requested lease agreement in which the type of car is specified and the use period thereof is selected by the service user. The service provider then indicates that the car lease has been completed, and that the point value corresponding to the offered lease has been deducted from the point value owned by the service user.

After accepting a car lease in which a car type is specified which the service user desires to lease among the presented car types and a lease period of the car is selected, various types, contents and a period of coverage of car insurance with regard to the car selected by the service user is communicated to the service user. At the same time or after presenting the types, contents and period of coverage of the car insurance, the point values for the types, contents and period of coverage of the car insurance is communicated to the service user. The service user then receives an application for car insurance which is voluntarily selected by the service user regardless of the type and lease period of the car which the service user has leased. A request is sent to the service provider to provide the car insurance which is selected by the service user and a report from the service provider is sent indicating that the car insurance has been provided, and that a point value corresponding to the car insurance has been deducted from the point value owned by the service user.

BRIEF DESCRIPTION OF THE DRAWINGS

FIG. 9 is a diagram for illustrating a relationship between a plurality of offered services and points for services purchased;

FIG. 15 is a diagram showing a menu used when altering a point agreement in the FIG. 2 embodiment.

DETAILED DESCRIPTION OF PREFERRED EMBODIMENTS

Figure 1:
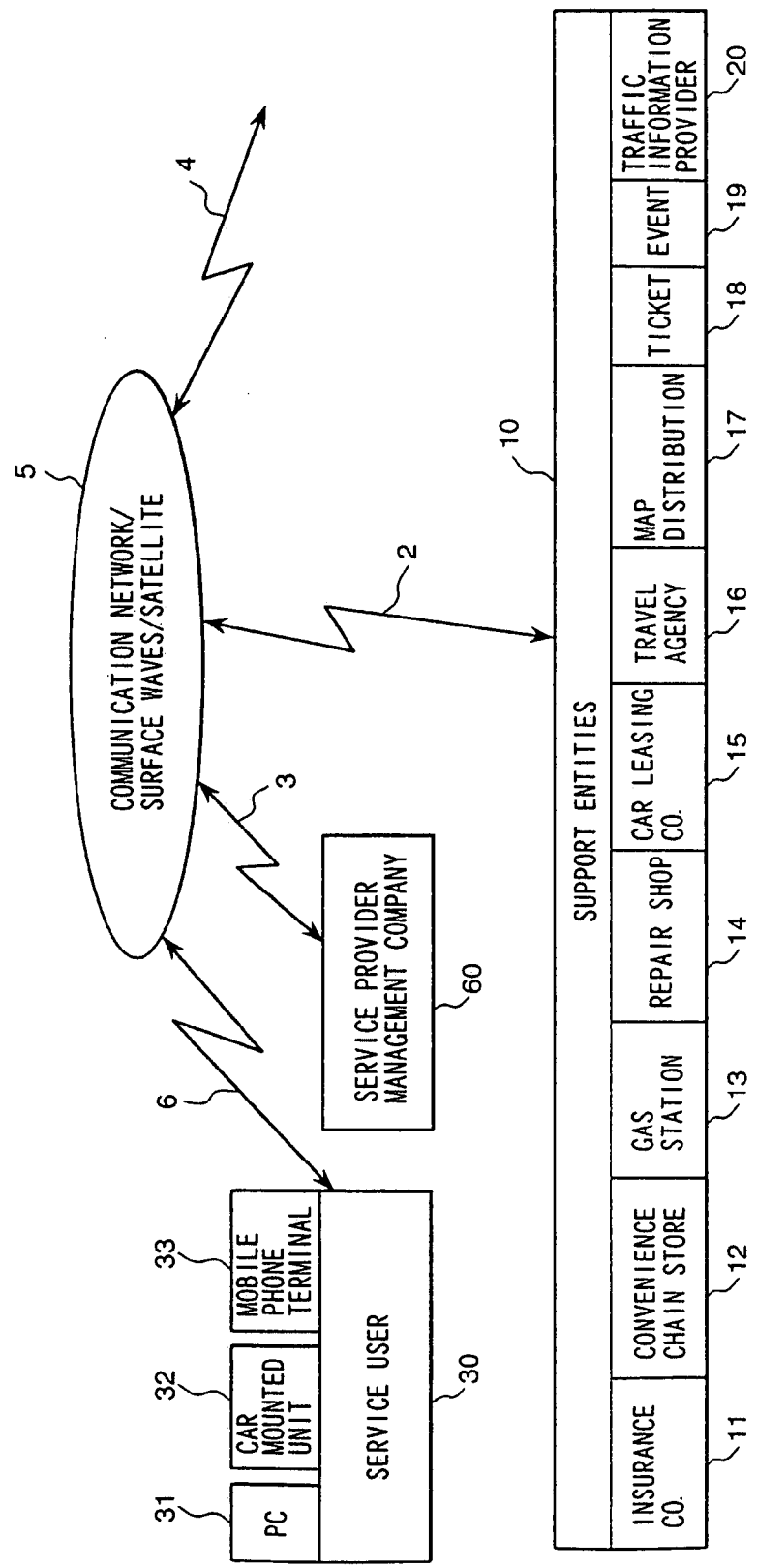
FIG. 1 is a block diagram showing an overview of the structure for performing a service providing method and illustrating the relationships of information transmission and reception according to the present invention.
Figure 2:
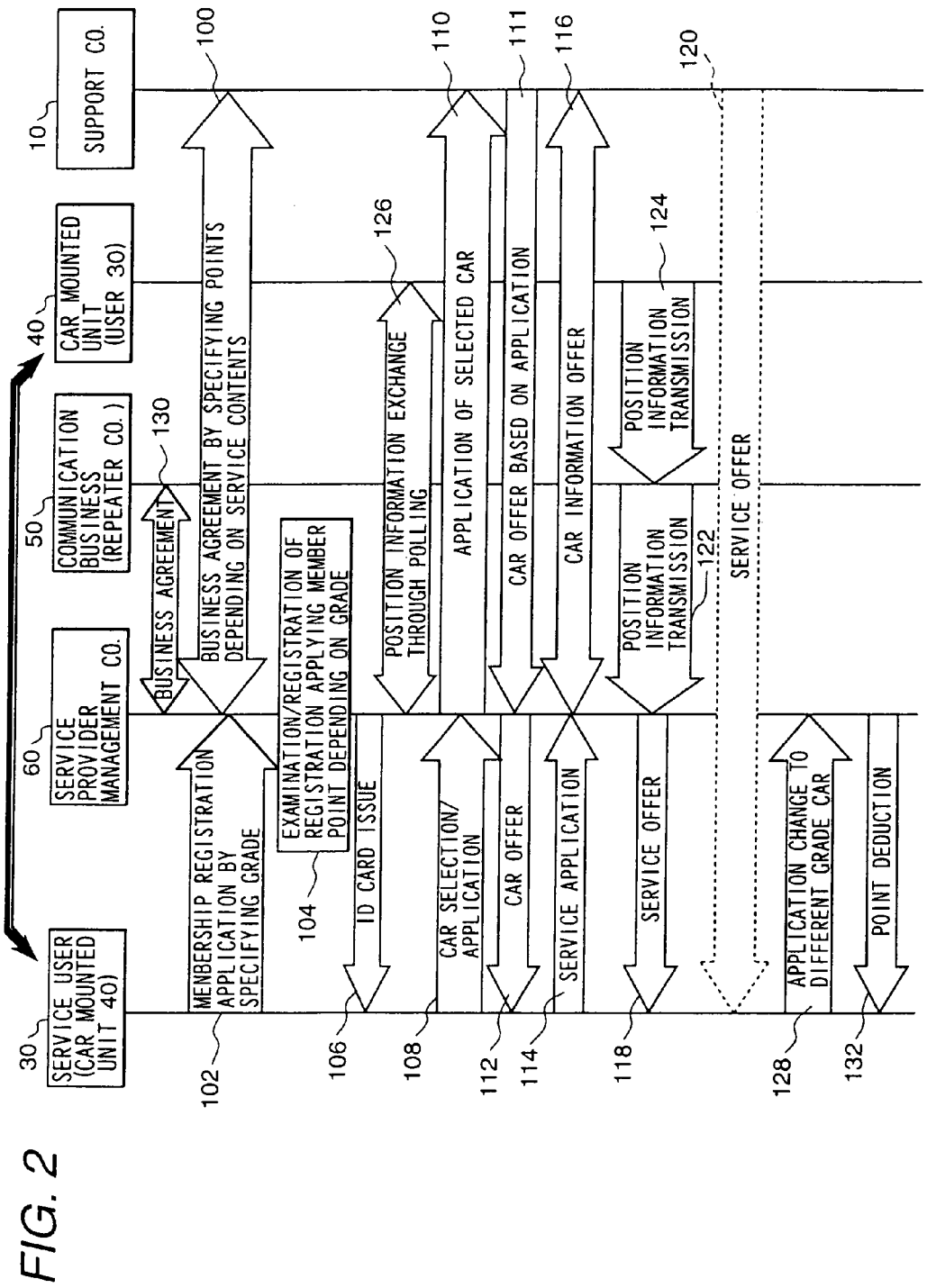
FIG. 2 is a service processing flow timing diagram representing an embodiment according to the present invention.

FIG. 1 shows an overview of a system for performing a service and a relationship of information transmission and reception according to the present invention, and FIG. 2 shows an embodiment of a service processing system and a processing method of providing services.

A service provider management company 60 provides services to service users 30. In order to improve the quality and to enrich the contents of the services, the service provider management company 60 concludes in advance agreements with support entities 10 with regard to the services which they offer.

The supporting entities 10 transmit information concerning a variety of services which they offer to the service provider management company 60. As a method of carrying out such transmission, public lines can be used. Further, a satellite can also be used; and, if a satellite is used for the transmission, the secrecy of each transmission is maintained and the quality of the concerned image data is improved. One of the exemplary methods through which information with regard to a variety of services is easily transmitted from the supporting entities 10 to the service provider management company 60 is one in which information with regard to a variety of offerable services is sent from the supporting entities 10 via a line 2 to a communication relaying medium 5, which makes use of a satellite having a long elliptical orbit, and the information with regard to a variety of services received at the communication relaying medium 5 is sent to the service provider management company 60 via a line 3.

As has been explained above, the supporting entities 10 are designed to provide a variety of services according to the agreements with the service provider management company 60. The entities referred to as supporting entities 10 are actually individual service providing companies, for example, including an insurance company 11, a chain of convenience stores 12, a gas station 13, a car repair shop 14, a car leasing company 15, a travel agency 16, a map distribution trader 17, a ticket dealer 18, an event planner 19, and a road traffic information provider 20. The insurance company 11 provides, for example, a car indemnity insurance service; the convenience store 12 provides, for example, a service involving the sale of articles; the gas station 13 provides, for example, a refuelling service; the car repair shop 14 performs a car repair service; the car leasing company 15 performs a car leasing service; the travel agency 16 provides a service of providing plans for traveling and sightseeing; the map distribution trader 17 performs a map distribution service involving maps of a variety of areas through use of a car navigation system; the ticket dealer 18 provides information with regard to concerts and plays and the service of selling tickets to such events; the event planner 19 provides the service of planning, drafting and executing a variety of events; and the road traffic information provider 20 provides information services with regard to the locations of traffic jams and the time in a nation wide area and in specific regions.

The service provider management company 60, which receives a variety of services from the supporting entities 10, sends desired service information based on a request from the service user 30 to the communication relaying medium (for example, a satellite having a long elliptical orbit) 5 via the line 3, and the communication relaying medium 5, which receives a variety of service information based on the request for the service user 30, sends the same via the line 6, for example, to a PC 31, a car mounted unit 32 or a portable phone terminal 33 carried by the service user 30. The car mounted unit 32 receives radio waves from a plurality of GPS satellites, determines the car position, and transmits the determined position information to the service provider management company 60 via the line or the communication relaying medium 5 and the line 3. Hereinbelow, in order to more easily understand the gist of the present invention, primarily a service providing method involving a car use (lease) service will be explained.

Referring to FIG. 2, the service provider management company 60 concludes business agreements 100 with regard to service offerings with the supporting entities 10 which support a variety of services, such as the insurance company 11, the convenience store chain 12, the gas station 13, the car repair shop 14, the car leasing company 15, the travel agency 16, the map distribution trader 17, the ticket dealer 18, the event planner 19, and the road traffic information provider 20. Under these business agreements 100, a variety of services which the supporting entities 10 can provide are offered in response to a request. Further, the service provider management company 60 sets the use fees for a variety of services, which the supporting entities 10 can provide, in the form of points and receives membership applications (102), while specifying points for grades of membership (magnitude of points) to service users 30 who desire a variety of services which the supporting entities 10 can provide. When a membership application (102) is for a high grade membership, it is examined to determine whether the membership applicant is appropriate as a high grade member (104). This point purchase application is a basis for receiving a variety of services, for example, a car use (lease) service.

Further, when the service provider management company 60 communicates with the supporting entities 10 and the service users 30, in order that the company 60 will be able to communicate, for example, with the car mounted unit 40 by making use of public lines and satellites, for example, of a communication business company 50, the service provider management company 60 enters into a business agreement 130 with the communication business company.

The service provider management company 60 issues an ID card to the membership applicant based on the membership application (102), while performing an examination with regard to a high grade membership application. On this ID card, there are recorded a code number for identifying the applicant as set by the service provider management company 60 and personal information of the service user 30 who applied for the membership. When the service user 30 receives the ID card, the service user 30 is credited with the points according to the membership agreement and the membership applicant is accepted as a member (a service user 30).

The points represent total points which can be used during the period of the agreement, when respective amounts of points are set for all of the available services, and the service user 30 can apply for and receive desired services within the limits of the total points owned.

At first, an example in which the service user 30 requests a car use (lease) service for his or her own use will be explained. The service user 30 performs a car selection/application, while specifying a desired car manufacturer A1, car model/type B1/C1, displacement volume (for example, 3000 cc), a yes or no selection of a car navigation unit, a yes or no selection of a sun roof, a body color (for example, white) and the lease period (for example, two years after first registration).

Based on the car selection/application (108) from the service user 30, the service provider management company 60 sends an application for the selected car to the car lease company 15 representing one of the supporting entities 10 (110); the car lease company 15 representing the supporting entity 10 provides a car as requested by the service user 30 to the service provider management company 60 (111); and the service provider management company 60 completes the car lease service to the service user 30 (112). Alternatively, when a car lease application is received from the service provider management company 60 (110), the car lease company 15 representing the supporting entity 10 may directly extend the car lease service to the service user 30 on behalf of the service provider management company 60 (120).

With regard to the requested car lease, it is necessary to determine whether and what type of car insurance (such as bodily injury liability insurance and property damage liability insurance) will be taken by the service user 30; and, therefore, car insurance can be applied for at the same time, while specifying the grade thereof, for example, with regard to bodily injury liability insurance of no upper limit and property damage liability insurance of ¥5,000,000. The points to be used vary depending on the grades of the car and the car insurance applied for.

Figure 7:
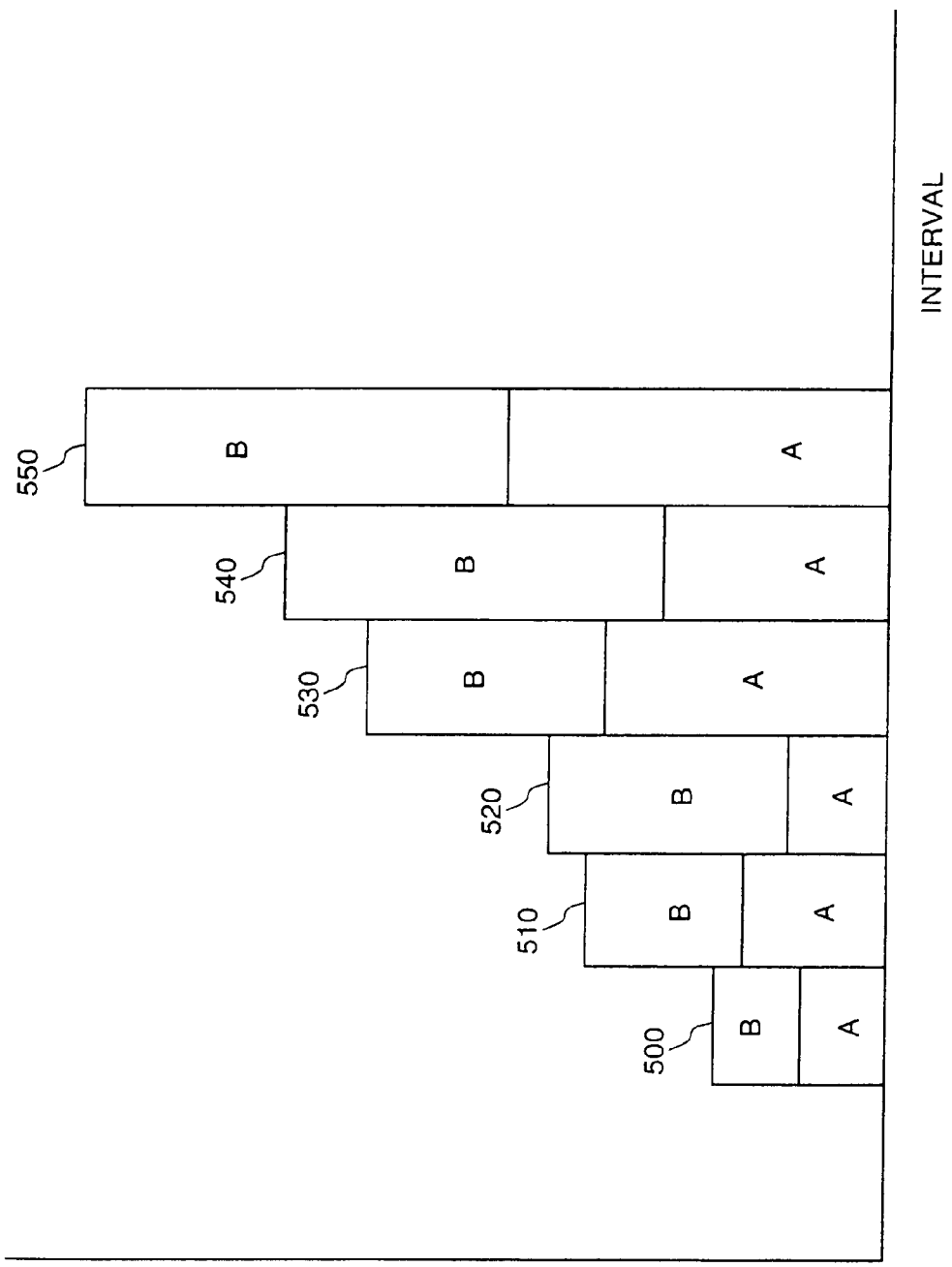
FIG. 7 is a diagram for illustrating a variation of car insurance service and other services with regard to a time interval.

A relationship between the car insurance with respect to the car used and other services (ITS service) is illustrated in FIG. 7. The abscissa in FIG. 7 represents an amount of points and the ordinate represents a time interval (in FIG. 7 the interval of one bar represents two months-1 year). In the present embodiment, the valid insurance period (for example, one month and six months) can be optionally set by the service user 30, the contents of the car insurance can be modified in a short period and, further, can be freely set regardless of the car model/grade. The examples shown in FIG. 7 are those of purchased car owners.

As seen from FIG. 7, since the amount of points paid for the insurance in each respective period varies, it is understood that the coverage provided by the insurance policy can be modified for respective predetermined periods (for example, one year). For example, the section A in bar graph 500 represents an insurance fee (points) for car insurance and section B in the bar graph 500 represents points for other services (ITS service). Further, in the bar graph 510, the section A represents an insurance fee (points) for car insurance and the section B represents points for other services (ITS service). Similarly, in the bar graphs 520, 530, 540 and 550, the sections A represent insurance fees for car insurance and the sections B represent points for other services (ITS service). When comparing these bar graphs 500-550, the insurance fees (points) for car insurance and the points for other services (ITS service) are respectively varied for respective predetermined periods, which shows that the contents of the insurance coverages are modified in every predetermined period, for example, according to the kinds of car insurance; and, the contents of the car insurance are varied depending on car use circumstances, while, at the same time, the contents of other services (ITS service) received for the respective corresponding periods are also varied. Namely, the service user 30 can freely set the coverage and service period of the car insurance depending on the car use requirements. With such a car insurance method, points saved from the car insurance can be freely used for other services (ITS service).

Figure 8:
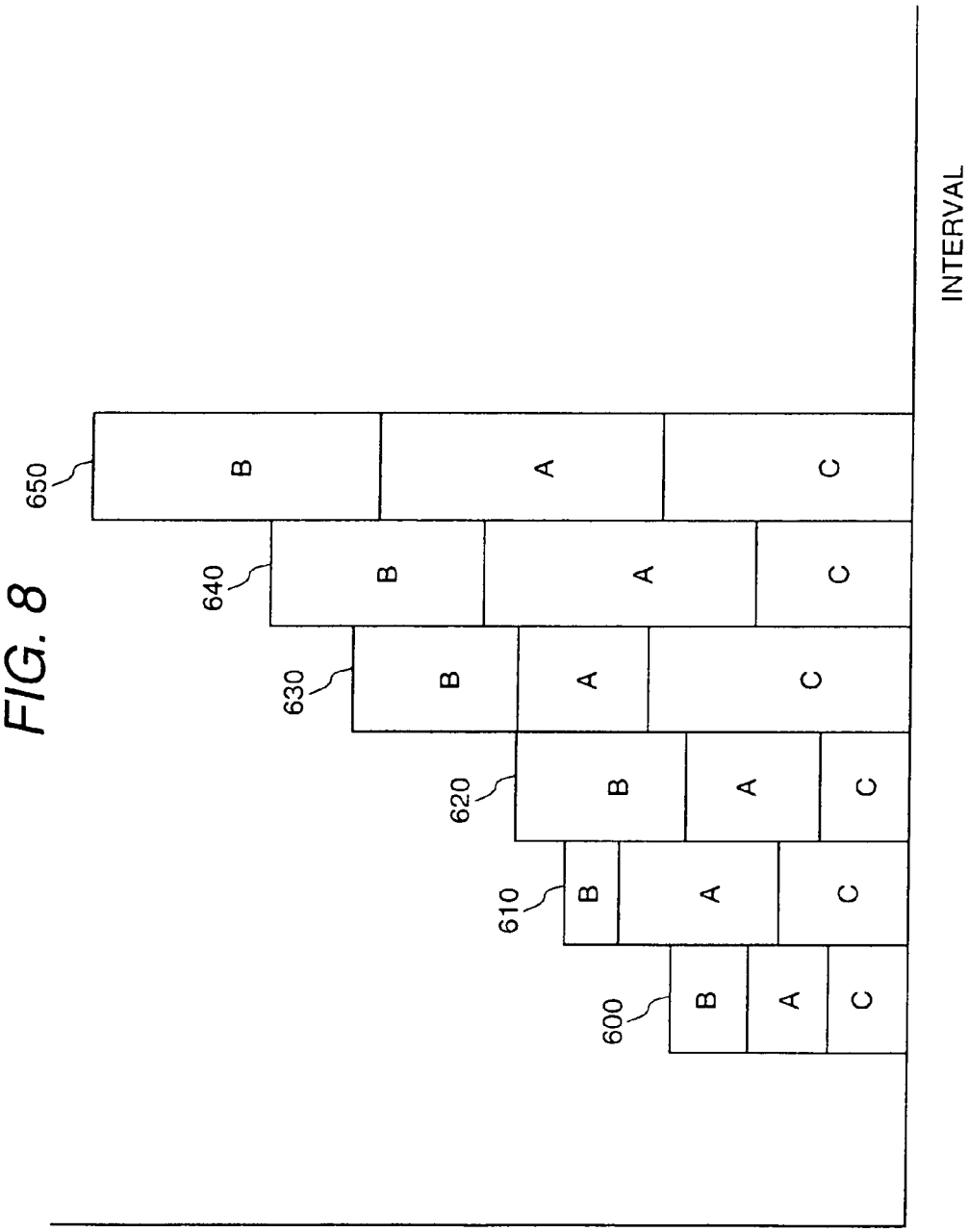
FIG. 8 is a diagram for illustrating a variation of car use service, car insurance service and other services with regard to a time interval.

FIG. 8 shows the variation in points when a service user 30 uses a specific car for a specific period as if the service user 30 owned the car without purchasing the car. With reference to FIG. 8, the relationship between a car use service (for example, a time limited lease from the first day of registration to 18 months later), car insurance for the car and other services (ITS service) will be explained.

The abscissa in FIG. 8 represents the amount of points and the ordinate therein represents time (for example, the interval of one bar represents 1 or 2 years). In FIG. 8, the section A in bar graph 600 represents the use fee (lease fee) of the car in points, the section B therein represents an insurance fee (in points) for car insurance and section C therein represents other services (ITS service) in points. Similarly, the sections A in bar graphs 610, 620, 630, 640 and 650 represent use fees (lease fees) for cars in points, the sections B represent insurance fees (in points) for car insurance, and the sections C represent points for other services (ITS service). When comparing these bar graphs 600-650, points representing the car use fee (lease fee) vary for every year, which implies that the service user 30 exchanges the car for a new car for every predetermined period and the grade of the new car varies every time. Further, the reason why the insurance fees in points for car insurance vary every year is that the contents of car insurance coverage will vary depending on the cars then being used.

Further, the variation of the insurance fees in points for the car insurance is slightly attributed to variation in the insurance coverage due to the grade difference of cars being leased. For example, for a high grade car, the property damage liability insurance is increased, while, on the other hand, for a low grade car, such as a light car on which the damage is large at the time of a collision, the property damage liability insurance is increased. In addition, the variation of the insurance coverage may be due to the type of use of the cars, such as private use or business use, and whether use thereof will involve frequent long distance travel or short distance travel. For example, in the case of exclusive long distance travel, an insurance coverage of high risk is to be provided. The variation of insurance coverage also may be due to travel conditions, such as travel time periods (for example, primarily in day time or at night).

Therefore, when using the car lease service according to the present embodiment, the service user 30 can freely exchange the car after a short period of use. Actually, when a new car is used for one month, the car becomes a used car, therefore, if a new car is leased, the ability to exchange the car is, for example, limited to two years. The service user 30 also can freely vary the insurance coverage depending on the circumstances of use of the car (for example, because of absence during July-September, no car insurance carried), and the service user 30 can receive double insurance coverage for a specific period (for example, during family travel), while receiving normal car insurance coverage of a low level at other times. According to the present embodiment, it is unnecessary to purchase and own a car in the conventional manner, and the service user 30 can freely exchange the car now being paid for another car. Further, the car insurance coverage (degree of services) can be specified depending on the car use circumstances, and the insurance coverage can be temporarily terminated freely for a specific period, when the car is not being used. Therefore, in such an instance, the balance of the points credited by a predetermined amount of payment increases, and the points saved due to reduction of the car insurance coverage can be freely used for other services (ITS service).

When the car lease company 15, representing one of the supporting entities 10, receives an application for lease of a selected car from the service provider management company 60 (110), the car lease company 15 provides the selected car to the service provider management company 60, and the service provider management company, 60 further provides the selected car to the service user 30; or, alternatively, the car lease company 15 directly provides the selected car to the service user 30 without routing the transaction through the service provider management company 60.

On one hand, when the service user 30 inserts the issued ID card into the car mounted unit 40 on the car that is provided, the personal information recorded in the ID card is transferred into the car mounted unit 40 and the car operates as if it were owned by the service user 30 (although legally the present condition is leasing). Thereby, the service user 30 can receive other services than the car providing service through communication with the service provider management company 60 via the car mounted unit 40.

When the service user 30 desires a service other than the car providing service, the service user 30 is required to insert the ID card into the car mounted unit 40 and apply for services other than the car providing service to the service provider management company 60 via the car mounted unit 40 (114). Although the services other than the car providing service include the service with regard to the car insurance (for example, bodily injury liability insurance and property damage liability insurance) as referred to above, services other than the car providing service further include services of other supporting entities 10 which conclude agreements with the service provider management company 60, such as article purchase payment (service through a credit card) in the convenience store 12, payment for refuelling at the gas station 13 (service through a credit card), a car repair service at the time of a car accident or break-down at the car repair shop 14, a travel and sightseeing plan providing service at the travel agency 16, a car navigation service at the map distribution trader 17, a ticket information service with regard to concerts and plays and a ticket selling service at the ticket dealer 18, an event providing service at the event planing agent and information providing service, such as locations of traffic jams and the time on a nation wide basis and in specific local areas, and a variety of information with regard to cars at the road traffic information provider 20.

These services, other than the car providing service, are obtained by way of the service application (114) from the service user 30 in FIG. 2. When the service application (114) from the service user 30 is transmitted via the car mounted unit 40 to the service provider management company 60, the service provider management company 60 transmits a request for the service desired by the service user 30 to one of the supporting entities 10 by way of the public lines and the satellites of the communication business company 50 (116), for example.

These requests for service from the service provider management company 60 to the supporting entities 10 are indicated as a car related information offer in FIG. 2 (116). When the service request (116) from the service provider management company 60 is transmitted to the supporting entities 10 by way of the public lines and the satellites of the communication business company 50, the service is offered from one of the supporting entities 10 to the service provider management company 60 (116). Based on this service offer, the service provider management company 60 transmits the desired service offering (118) to the car mounted unit 40 of the service user 30 by making use of the public lines and the satellites of the communication business company 50. The service transmitted to the car mounted unit 40 is transferred to the service user 30 through the unit 40.

Further, when a service offer is requested from the service provider management company 60 to one of the supporting entities 10 by way of the public lines and the satellites of the communication business company 50, for example, the service offer from the supporting entity 10 can be directly communicated to the service user 30 without routing the information through the service provider management company 60 (120). Further, information indicating the position of the car used by the service user 30 is transmitted from the car mounted unit 40 to the communication business company 50 (122), and the car position information transmitted to the communication business company 50 is transmitted to the service provider management company 60 by way of the public lines and the satellites of the communication business company 50 so as to identify the position of the car. Alternatively, the position of the car can be determined by receiving radio waves from a plurality of GPS satellites through polling of the service provider management company 60 and communication with the car mounted unit 40 (126).

Further, before terminating the lease period of the car now being used, the service user 30 can exchange the car for a different car having a different grade, or he or she can use, in addition to the car now being used, another car having a different grade, while setting a specific short lease period.

When the service user 30 receives these variety of services, the service user 30 pays the cost of the variety of services with his or her points, and these points are deducted from the points owned by the service user 30 (132). The point deduction is performed, for example, monthly, and further, the purchase of points, the amount of which is different depending on the grade of the membership, is performed by drawing out periodically a predetermined amount of money corresponding to a predetermined amount of points from the bank account of the service user 30.

Although the above car lease service has been explained under the precondition that a new car is used, the same is true with regard to a used car; however, in such an instance, the first registration year and month is added to the car selecting condition.

Now, the processing flow for effecting membership registration at the service provider management company 60 in response to receipt of a membership application will be explained with reference to FIG. 3.

Figure 3:
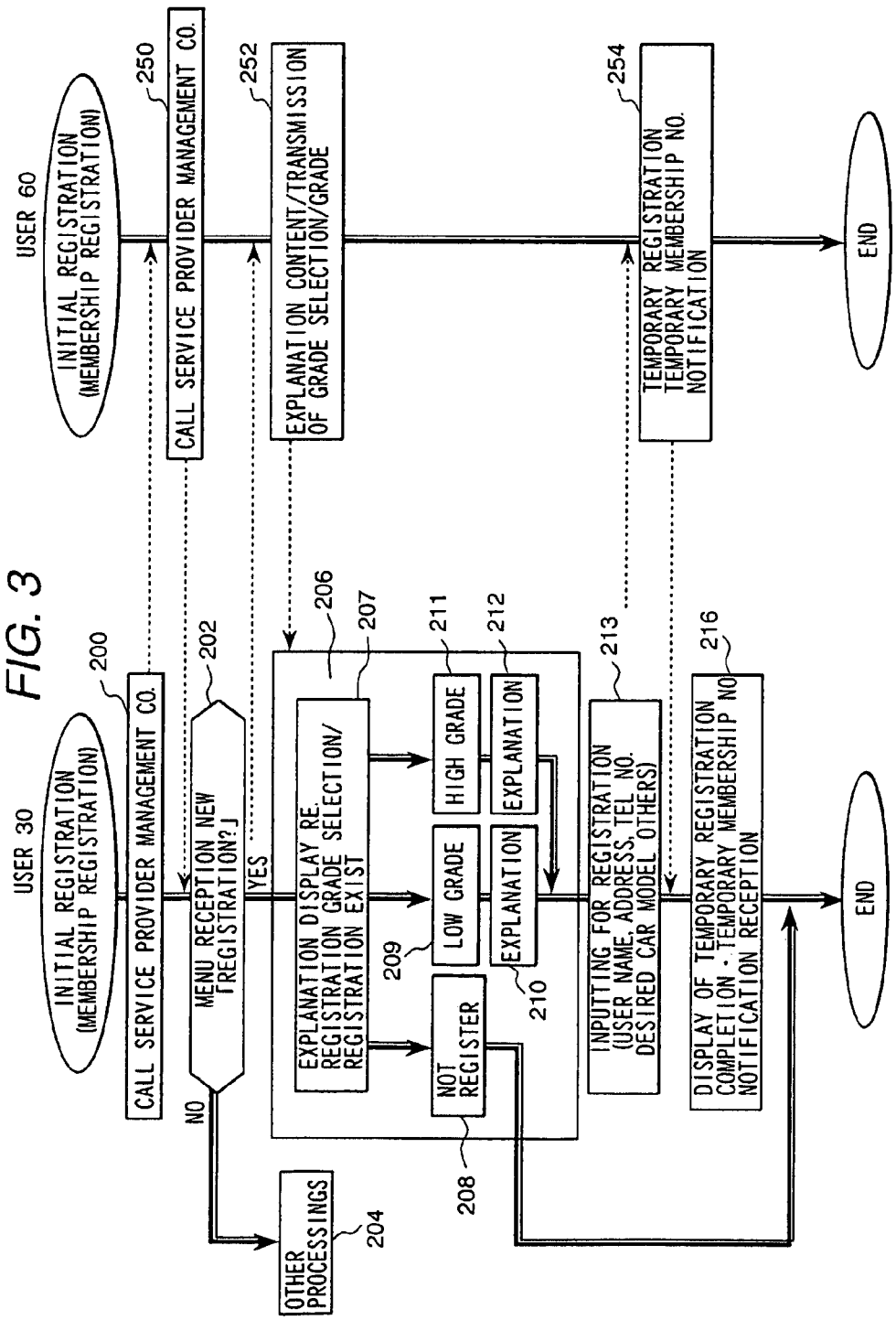
FIG. 3 is a processing flowchart of membership registration performed at the service provider management Co. in response to a membership application in the FIG. 2 embodiment.

In FIG. 3, a person who desires to receive a variety of services offered by the supporting entities 10 is required to be registered as a member by the service provider management company 60. A person (service user 30) who desires to be registered as a member by the service provider management company 60 has to call up the service provider management company 60 by use of one of the terminal units, such as the PC 31, the car mounted unit 32 and the portable phone terminal 33, at step 200. When the person who desires to be registered as a member calls up (accesses) the service provider management company 60, the service provider management company 60 receives the call at step 250 and sends back an answer to the service user 30. When the answer comes from the service provider management company 60, a membership registration menu from the service provider management company 60 is displayed at the terminal unit of the service user 30 at step 202, and the service user 30 is required to input whether or not the membership registration application is a "new registration". When the service user 30 indicates that the present membership registration application is not a new registration at the step 202, the process moves to step 204 to perform other processes.

On the other hand, when the service user 30 indicates that the present membership registration application is a new registration at step 202, this inputted response is transferred to the service provider management company 60, and then data indicating the privileges that are available to a registered member and the amount to be paid by a member (periodic purchase of points) for every grade of membership are transmitted to the terminal unit of the service user 30 at step 252. Then, at step 206, an explanation with regard to the terms of the registration (such as obligations of a member depending on membership grades and privileges of the membership) is displayed at the terminal unit of the person (service user 30) who desires to be registered as a member by the service provider management company 60 (step 207). After the step 207, at the terminal unit of the person (service user 30) who desires to be registered as a member, a menu including the options "not register as a member", "low grade membership" and "high grade membership" are displayed, and the person (service user 30) who desires to be registered as a member is required to select one of the three items displayed. Namely, the person is required to specify whether he or she is to be registered as a normal grade point member or a high grade point member.

Based on the image display at step 207, if a person selects "not register as a member" at step 208, the process ends. Further, based on the image display at step 207, when "low grade membership" is selected at step 209, "an explanation with regard to membership privileges membership obligations and membership registration requirements (such as address, name, ID presentation and age limitation) for a "low grade membership" is displayed at step 210. Further, based on the image display at step 207, when "high grade membership" is selected at step 211, an explanation with regard to membership privileges, membership obligations and membership registration requirements (such as ad dress, name, ID presentation and age limitation) for a "high grade membership" is displayed, and an examination as to whether to register the applicant as a "high grade member" is performed at step 212.

At step 206 when either "low grade membership" or "high grade membership" is selected and the explanation with regard to the details of a membership has been communicated to the applicant, the provider management company 60 transmits image display data for inputting of fill-in items necessary for membership registration (such as user name, address, telephone number, sex, age, occupation, ID, bank account, desired car model) to the terminal unit of the person (service user 30) who desires to be registered as a member; and, at step 213, the person (service user 30) who desires to be registered as a member is required to input the fill-in items necessary for the membership registration. When the person (service user 30) who desires to be registered as a member inputs the fill-in items necessary for the membership registration on the screen at the terminal unit, the inputted data on the screen is transmitted to the service provider management company 60. After receiving the inputted data on the screen, the service provider management company 60 confirms the fill-in items necessary for membership registration inputted by the person (service user 30) who desires to be registered as a member, temporarily registers the person (service user 30) who desires to be registered as a member as a candidate member (temporary membership registration) and transmits a notification of temporary membership and a temporary membership number to the terminal unit of the person (service user 30) who desires to be registered as a member. The temporary registration operates to register the person as a temporary member and not as a regular member, and the person will be registered as a regular member after it has been determined that the applicant satisfies predetermined requirements. The valid period of the temporary membership is limited (for example, to three months); therefore, if the predetermined requirements necessary for registering an applicant as a regular member are not satisfied within a predetermined period, registration of the applicant as a regular member is refused, and the temporary membership is invalidated after the predetermined period has passed. The reason for offering the temporary membership is for satisfying a person who desires to be registered as a member to receive service as a member immediately, even if the benefits thereof are limited. The temporary member can basically receive services as a regular member, however, it is not necessarily true that the temporary member can receive all of the services which a regular member can enjoy; and, the services which can be received are limited and the services which can be enjoyed by a temporary member are determined in advance by the service provider management company 60.

When the transmission of notification of the temporary membership is received, it is displayed at the terminal unit of the person (service user 30) who desires to be registered as a member, indicating that the person is temporarily registered as a candidate for membership, while indicating a given temporary membership number on the screen. Thus, the temporary membership registration has been completed.

At the time of this membership registration processing, even when a person (service user 30) who desires to be registered attempts to input all of the fill-in items necessary for membership registration at that moment, it sometimes happens that it is difficult to input all of the fill-in items at the moment. Therefore, actually, the service provider management company 60 determines in advance minimum necessary data, which will satisfy an initial condition if such data are input, and allows the temporary registration of the applicant as a membership candidate when the minimum necessary data is received. Thereafter, the service provider management company 60 requires the person (the service user 30) who desires the membership registration to supplement remaining unfilled-in data, and, if all remaining data is not supplemented within a predetermined period (for example, a valid period of the temporary membership and a period until the applicant is to be registered as a regular member), processing is performed whereby the temporary membership registration is invalidated and the temporary membership registration is canceled without registering the applicant as a regular member at the time when the valid period of the temporary membership registration has passed.

Figure 4:
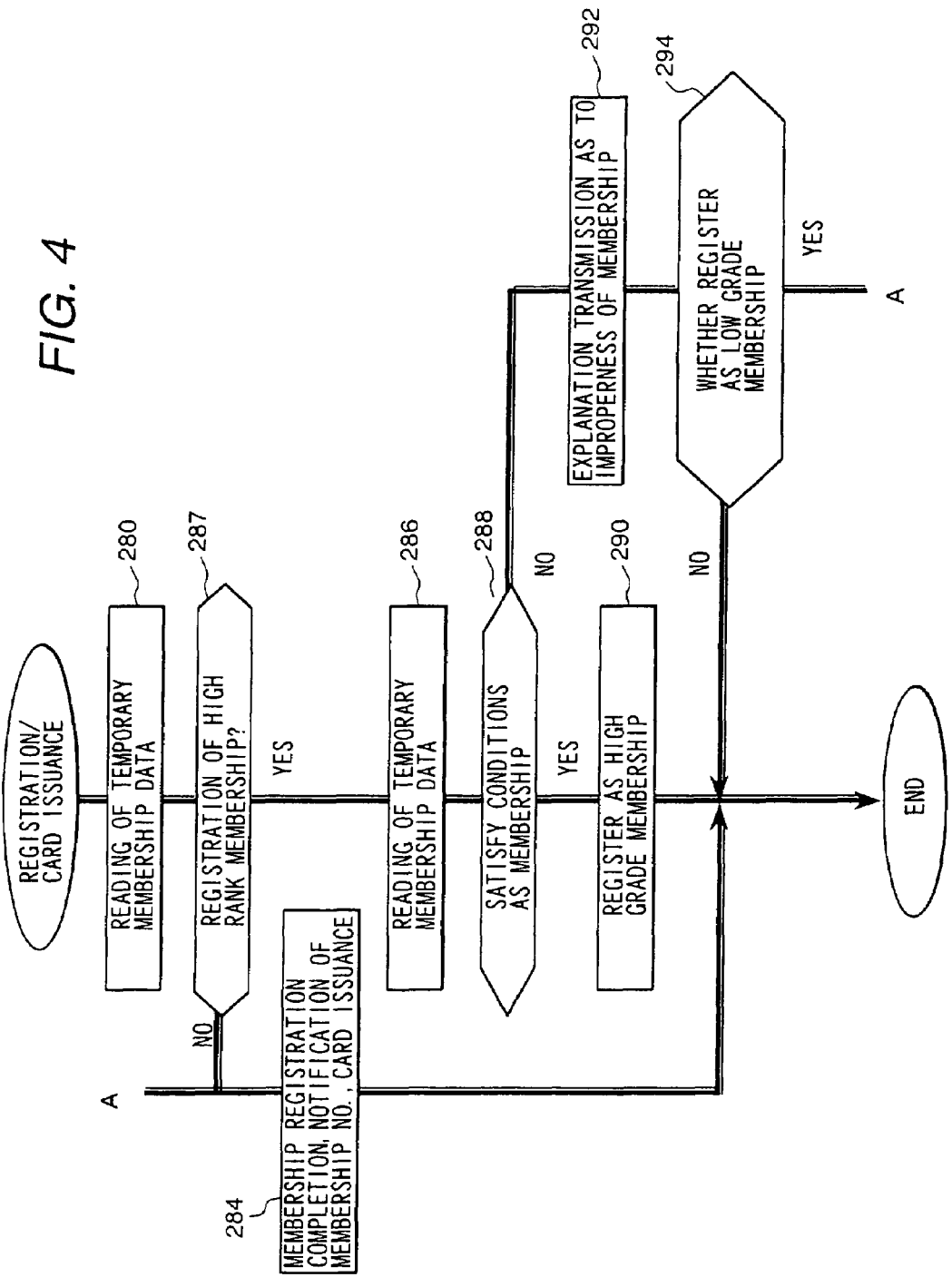
FIG. 4 is a processing flowchart of operations performed at the service provider management Co. after a temporary registration is completed in the FIG. 2 embodiment.

FIG. 4 shows the processing flow at the service provider management company 60 for processing the membership registration request from a person (the service user 30) who desires a membership registration after the temporary registration has been completed.

In FIG. 4, through a terminal unit possessed by a person (the service user 30) who desires the membership registration, the fill-in items necessary for the membership registration are input and the inputted data is transmitted to the service provider management company 60. After receiving the input data, the service provider management company 60 registers the person as a temporary member; and, after completing assignment of the temporary membership number, at step 280, data of the registered temporary member is read, and, at step 282, it is judged whether the newly registered temporary member has been given a "low grade membership" or a "high grade membership".

Figure 13:
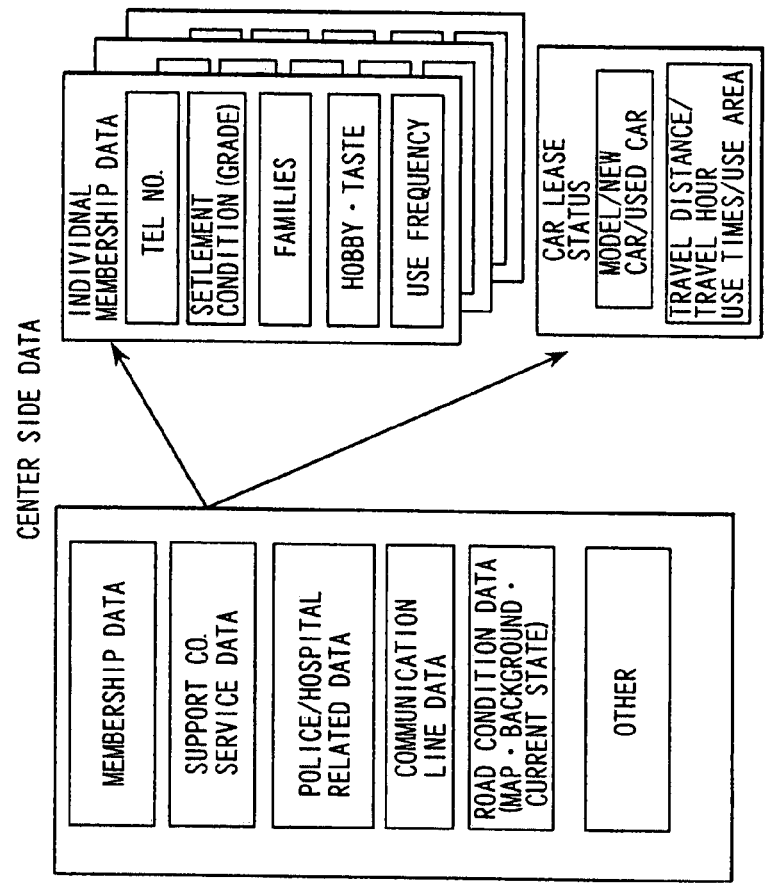
FIG. 13 is a diagram showing a data file of service users at the service provider management Co. in the FIG. 2 embodiment.

At step 282, if it is judged that the newly registered temporary member does not have a "high grade membership", in other words, the temporary member has a "low grade membership", at step 284, and it is confirmed that the registered temporary member satisfies predetermined conditions for a "low grade membership", registration of the temporary member for a "low grade membership" (regular membership) is performed and notification of the membership number and issuance of a membership card to the temporary member are performed. Also, the personal data as shown in FIG. 13 is recorded and stored in a memory of the service provider management company 60. Generally, a registered temporary member is registered as a low grade member" without specific examination, if the necessary fill-in items are satisfied. For the issuance of the membership card, for example, an ID card for a "low grade membership" is prepared and the same is mailed to the member. However, the method of issuing a membership card is not limited specifically. For example, an IC card with no record may be sent at the time of temporary membership registration; and, at the time regular membership registration, through the terminal unit possessed by the person (the service user 30) who desires a membership registration, the necessary data can be written on the IC card.

Further, at step 282, if it is judged that the registered temporary member is to have a "high grade membership", at step 286, it is at first judged whether the registered temporary member can be registered as a "low grade member", namely, whether the predetermined conditions of a "low grade membership" are satisfied. If the registered temporary member satisfies the predetermined conditions for a "low grade membership", an examination is performed to determine whether the registered temporary member is entitled to a "high grade membership" in connection with such factors as age, annual income, continuous service years, whether he or she owns a house or rents a house, and the existence or absence of a guarantor. The 30 reason why a judgement is first made to determine whether the registered temporary member satisfies the predetermined conditions for a "low grade membership" is that if the registered temporary member satisfies the predetermined conditions for a "low grade membership", there is a good possibility that the registered temporary member can be regularly registered as a "high grade member". Based on the examination of factors, for a "high grade membership", it is judged at step 288 whether the registered temporary member is entitled to receive a "high grade membership" (whether the member satisfies predetermined conditions for a "high grade membership"). When it is judged at step 288 that the registered temporary member is entitled to receive a "high grade membership", and it is confirmed at step 290 that the registered temporary member satisfies the predetermined conditions for a "high grade membership, the registered temporary member is registered as a "high grade member" (a regular membership) and notification of the membership number and issuance of a membership card to the member are performed. The personal data as shown in FIG. 13 is recorded and stored in a memory at the service provider management company 60. The issuance of the membership card is performed in the same manner as the issuance of a membership card for a "low grade membership". Since the grade of the membership card for a "high grade membership" is high, the card can be prepared, for example in the form of gold card so as to permit judgement at a glance that the card holder has a "high grade membership".

Further, at step 288, if it is judged that the registered temporary member is not entitled to receive a "high grade membership" at step 292, an explanation indicating that the registered temporary member does not satisfy the predetermined conditions of a "high grade membership" (improper high grade membership) is transmitted to the temporary member, and, at the same time, an inquiry is set to the temporary member to determine whether the member desires to be registered as a "low grade member". After waiting for a response from the temporary member with regard to the inquiry as to whether the member agrees to be registered as a "low grade member", at step 292, when an answer is received refusing the membership registration as a "low grade member", or when no response is received within a predetermined period from the temporary member, the registration processing is ended and the temporary member is not registered as a regular member. Further, at step 294, when a response accepting membership registration as a "low grade member" is received (an application reception), the processing moves to step 284.

A member that has been registered in the manner explained above is required to purchase points depending on the grade of his or her membership for every predetermined period (for example, for every month); and, as a method of purchasing the points, a fee corresponding to the points depending on the grade of the membership is drawn from the bank account of the member every predetermined period (for example, every month).

Figure 5:
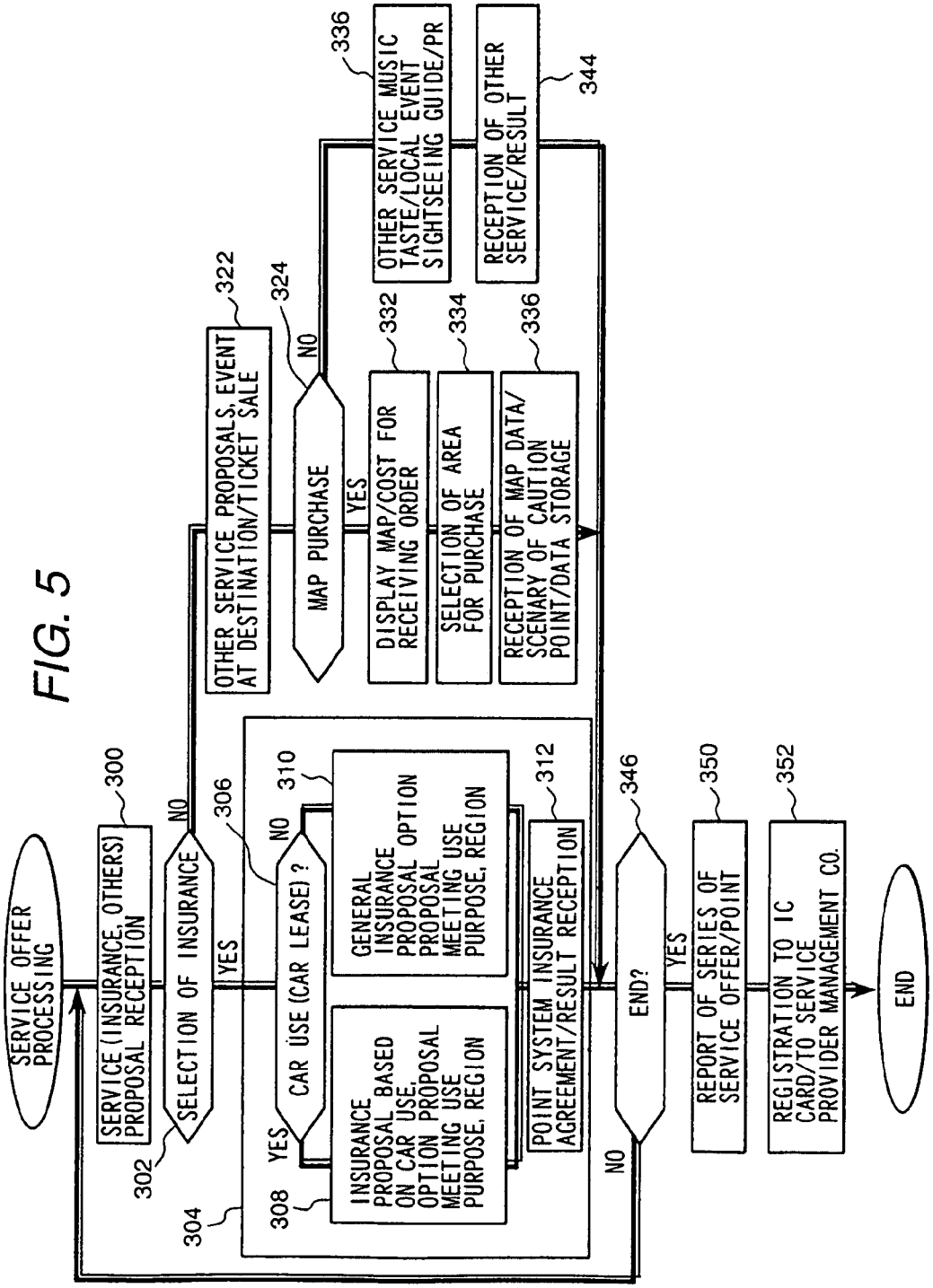
FIG. 5 is a processing flowchart of operations performed when a service user receives a service offer in the FIG. 2 embodiment.

A member who has been registered in the manner explained above, namely the service user 30, can receive a service offer depending on the membership grade (points owned) of the member. FIG. 5 shows a processing flow that occurs when a service user 30 receives such service offers.

In FIG. 5, when the service user 30 desires a service, the service provider management company 60 proposes at step 300 services which can be offered to the service user 30. The service contents reflect a variety of services provided by the support entities 10 and includes such services as the purchase of car insurance (for example, bodily injury liability insurance and property damage liability insurance), purchase of articles (service through a credit card) in the convenience store chain 12, refuelling at the gas station 13 (service through a credit card) a car repair service at the time of car accident or breakdown at the car repair shop 14, a travel arrangement service at the travel and tourist agency 16, a local map distribution service through a car navigation system by the map distribution trader 17, a ticket information service with regard to concerts and plays and the purchase of a ticket from the ticket dealer 18, an event planning, drafting and executing service provided by the event planning agent 19, and an information providing service which provides information such as the location of traffic jams and the time of day on a nation wide scale and in specific local areas, and a variety of information with regard to cars, from the traffic information provider 20.

After the services which can be offered to the service user 30 are proposed at step 300, the service provider management company 60 judges at step 302 whether a service desired by the service user 30 involves the purchase of car insurance (for example, bodily injury liability insurance and property damage liability insurance).

When it is judged at step 302 that the service desired by the service user 30 involves the purchase of car insurance (for example, bodily injury liability insurance and property damage liability insurance), the processing at step 304 is performed. At sub-step 306 in the step 304, it is judged whether the service user 30 already has leased a car through the case use service. Namely, it is judged whether the service user 30 desires to purchase car insurance (for example, bodily injury liability insurance and property damage liability insurance) under a condition in which the service user 30 has a car under lease through the car use service.

When it is judged at sub-step 306 that the service user 30 already has a car under lease through the case use service, at sub-step 308, the service provider management company 60 displays a specific car insurance type (for example, bodily injury liability insurance and property damage liability insurance) based on the car now under lease and the insurance cost thereof; and, in addition to the specific car insurance proposals, the management company 60 further proposes an option (for example, an insurance with high security because of substantial night driving) which will meet the purpose of use (for example, leisure use, night driving use and business use) and the typical use area (for example, long distance drive, seaside area drive).

Further, if it is judged at sub-step 306 that the service user 30 does not have a car under lease through the car use service, at step 310 the service provider management company 60 displays a general car insurance type (for example, bodily injury liability insurance and property damage liability insurance) and the insurance cost thereof; and, in addition to the general car insurance proposals, the management company 60 further proposes an option (for example, an insurance with high security because of substantial night driving) which will meet the purpose of use (for example, leisure use, night driving use and business use) and the typical use area.

When the car insurance plans are proposed at sub-steps 308 and 310, the service user 30 selects one of the insurance plans which the service user 30 desires to receive based on the proposed insurance coverage, and an application for an insurance agreement is submitted. When such an application for an insurance agreement is submitted by the member, the service provider management company 60 calculates the points required for the insurance in response to the application for the insurance from the service user 30 at step 312, the coverage of the insurance plan is confirmed and a point receiving processing is performed according to the agreement.

Further, at step 302 when it is judged that the service desired by the service user 30 is not the purchase of car insurance, services other than the offer of car insurance are proposed at step 322. The services, other than those concerning car insurance, include, for example, article purchase (service through a credit card) in the convenience store chain 12, refuelling at the gas station 13 (service through a credit card), a car repair service at the car repair shop 14, a travel arrangement service at the travel and tourist agency 16, a local map distribution service through a car navigation system by the map distribution trader 17, a ticket information service with regard to concerts and plays and ticket sales by the ticket dealer 18, an event planning, drafting and executing service by the event planning agent 19, and an information providing service, such as the location of traffic jams and the time of day on a nation wide basis and in specific local areas, and provision of a variety of information with regard to cars, by the traffic information provider 20.

At step 322, if a service other than the car insurance service is proposed, the service provider management company 60 judges at step 324 whether the service offer desired by the service user 30 is a map purchase application from the map distribution trader 17. When it is judged at the step 324 the service offer requested by the service user 30 is the purchase of a map from the map distribution trader 17, the service provider management company 60 transmits, at step 332, map selection data for receiving an order and the cost of the respective maps to the car mounted unit 40 of the service user 30 and displays the same on the display of the car mounted unit 40. After transmitting the map selection data and the cost thereof to the car mounted unit 40 of the service user 30 at step 332, the service provider management company 60 receives, at step 334, data with regard to a map area selected by the service user 30 based on the displayed map selection data on the display of the car mounted unit 40, and the management company 60 confirms the map selection with regard to the map area indicated by the service user 30. After receiving the data with regard to the selected map area from the service user 30 at step 334, the service provider management company 60 transfers the area map data requested by the service user 30 to the car mounted unit 40 of the service user 30 at step 336, and the service user 30 receives the map data and accompanying landscape information for portions of special interest on the map transferred from the service provider management company 60. This data is held until terminating the service offer request.

Further, if it is judged at step 324 that the service offer desired by the service user 30 does not involve a map purchase, the service provider management company 60 transfers, at step 342, other service menu data to the car mounted unit 40 of the service user 30 and proposes other services. The other services proposed by the service provider management company 60 include, for example, article purchase (service through a credit card) in the convenience store chain 12, refueling at the gas station 13 (service through a credit card), a car repair service at the car repair shop 14, a travel arrangement service at the travel and tourist agency 16, a ticket information service with regard to concerts and plays and ticket sales by the ticket dealer 18, an event planning, drafting and executing service by the event planning agent 19, and an information providing service, such as the location of traffic jams and the time of day on a nation wide basis and in specific local areas, and provision of a variety of information with regard to cars, by the traffic information provider 20.

When the other services are proposed at step 342, the service provider management company 60 waits for the selection of a service desired by the service user 30 among the other services displayed on the display of the car mounted unit 40, and when a selection of service by the service user 30 is performed, the service selection data is transmitted from the car mounted unit 40 of the service user 30 to the service provider management company 60. When the service provider management company 60 receives, at step 344, the service selection data transmitted from the service user 30, the service provider management company 60 transmits the received service request to the car mounted unit 40 of the service user 30 to confirm the request of the service user 30.

When the processing of the insurance coverage at step 304, the processing of map data reception by the service user 30 at step 336 and the processings of other service data reception by the service user 30 at step 344 are performed, it is judged at step 346 whether the processing of the service desired by the service user 30 is completed at step 346. If it is judged at step 346 that the processing of the service desired by the service user 30 is not completed at step 346, the process returns to step 300. On the other hand, if it is judged at step 346 that the processing of the service desired by the service user 30 is completed at step 346, data identifying a series of services offered to the service user 30 by the service provider management company 60, point number data used therefor and remaining point number data of the service user 30 are transmitted at step 350 to the car mounted unit 40 of the service user 30 to provide such information to the service user 30.

When the reporting of the series of services offered is performed at step 350, the fact that the service user 30 has received a service is registered to the ID card at step 352, as well as to the data file of the concerned service user 30 at the service provider management company 60. Thereby, the points owned by the service user 30 are reduced by an amount corresponding to the service received.

Figure 6:
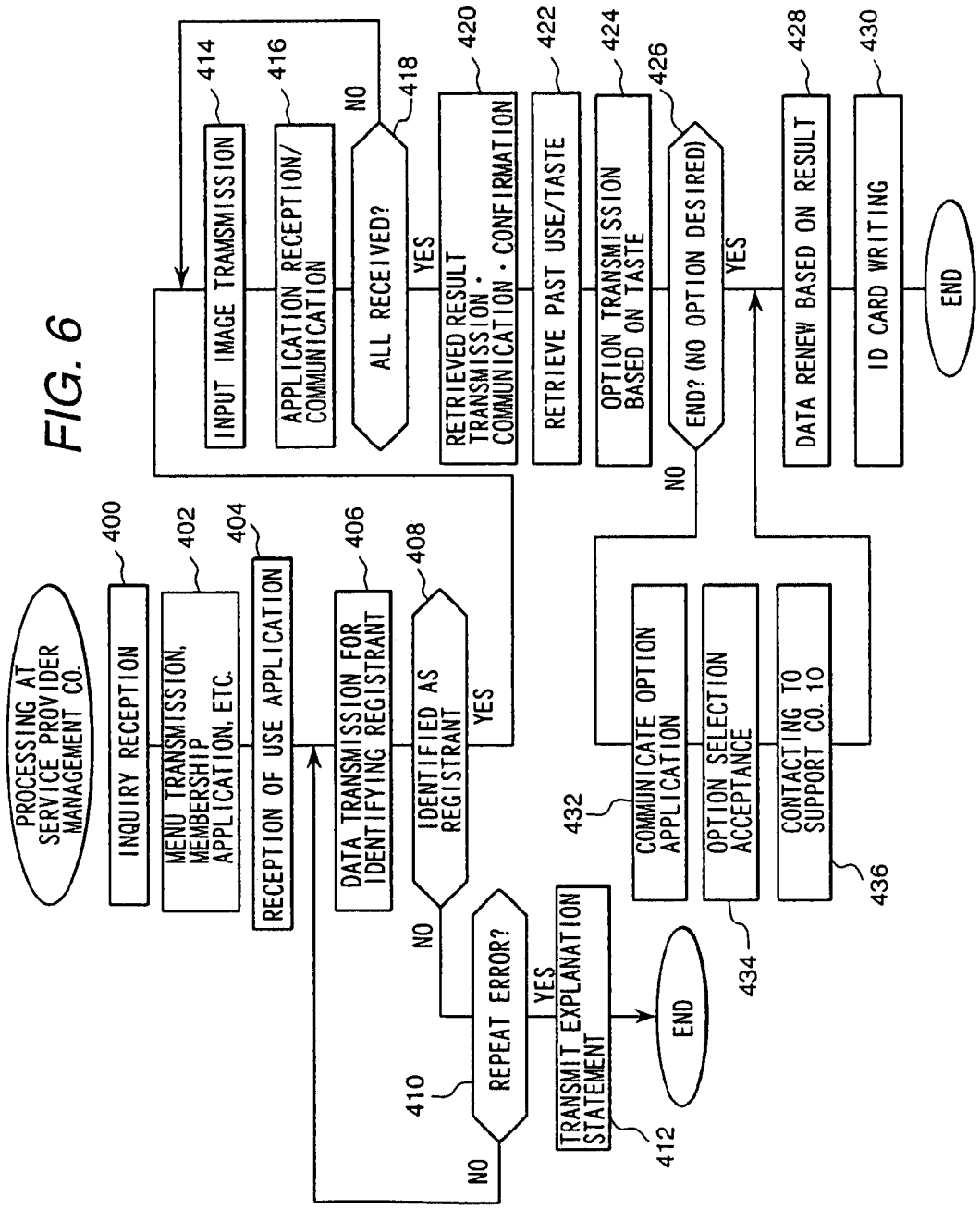
FIG. 6 is a processing flowchart of operations performed at the service provider management Co. in response to an application of a service offer by a service user in the FIG. 2 embodiment.

In response to such service application by the service user 30, the service provider management company 60 performs processings as shown in FIG. 6. In FIG. 6, when a service user 30 sends inquiries (such as membership application and service application), the service provider management company 60 receives, at step 400, the inquiries from the service user 30, and performs such operations as menu transmission to the car mounted unit 40 of the service user 30 and reception processing of the membership application received from the service user 30 at step 402. After performing menu transmission to the service user 30 and the reception processing of a received membership application at step 402, the service provider management company 60 waits for a service request from the service user 30. When the service user 30 sends a service request by making use of the ID card, the service provider management company 60 receives the service request from the service user 30 at step 404.

When receiving the service request from the service user 30 at step 404, the service provider management company 60 transmits data for certifying whether the service user 30, who applies for the service, is the actual registered member entitled to use the car mounted unit 40 of the service user 30 at step 406; and, after waiting for and receiving an answer from the service user 30, the service provider management company 60 judges whether the service user 30 who has requested the service is actually the registered member at step 408.

When it is judged at step 408 that the service user 30 who requests the service is not actually the registered member, it is further judged at step 410 whether the service user 30 has committed an error in using an ID card of a different person from the service user 30. If it is judged at step 410 that the service user 30 has not committed an error in using the ID card of a different person from the service user 30, the process returns to step 406, and, again, the service provider management company 60 transmits data for certifying whether the service user 30 who requests service is the actual registered member entitled to use the car unit 409.

Further, if it is judged at step 410 that the service user 30 repeats the error in using the ID card of a different person from the service user 30, an explanation indicating that the service user 30 appears to be using the ID card of a different person from the service user 30 is transmitted at step 412 to end the process.

Further, when it is judged at step 408 that the service user 30 who requests service is confirmed as the actual registered member, image data of providable services are transmitted to the car mounted unit 40 of the service user 30 at step 414, and an input from the service user 30 is awaited. Thereafter, the service user 30 may request a service by making use of the input image on the display of the car mounted unit 40. When a request for service is inputted by the service user 30, the image input data is transmitted from the car mounted unit 40 of the service user 30, and, when the service provider management company 60 receives the data at step 416, the acknowledgment of data received is transmitted to the car mounted unit 40 of the service user 30. After receiving the service request at step 416, it is judged at step 418 whether the service provider management company 60 has received all of the service requests from the service user 30.

If it is judged at step 418 that the service provider management company 60 has not received all of the service requests from the service user 30, the process returns to step 414, and the same processing is repeated until all of the service requests from the service user 30 have been received. Further, when it is judged at step 418 that the service provider management company 60 has received all of the service requests from the service user 30, the service provider management company 60 retrieves, at step 420, all of the services requested by the service user 30, transmits the retrieved result to the service user 30 and communicates with the service user 30 to confirm that the service contents desired by the service user 30 have been received. When the service content desired by the service user 30 is confirmed at step 420, information as to the past service use and the taste of the service user 30 is retrieved at step 422 and an option based on the past service use and the taste of the service user 30 is transmitted to the service user 30. After transmitting the option at step 424, it is judged whether the service user 30 desires the option transmitted at step 426. When it is judged at step 426 that the service user 30 does not desire the option so transmitted, the data of the service user 30 is renewed by such resultant data at step 428. Subsequently, the renewed data is written into the ID (or an IC card having an embedded IC chip) card of the concerned service user 30 at step 430 to end the processing flow.

FIG. 9 is a point table showing a relationship between a plurality of provided services and the number of points related thereto. In FIG. 9, column 686 indicates the date of use, column 688 identifies the transaction items, column 690 represents points given, column 692 represents points used and column 694 represents points which remain. Further, row 670 represents titles; row 672 indicates that the remaining points at January 10, Heisei 12 is 2200; row 674 indicates that 1000 points were given through point purchase at January 10, Heisei 12 and the balance of points changed to 3.2000; row 676 indicates that plants 800 were used for a car lease fee on January 15, Heisei 12 and that the balance of points changed to 2400; row 678 indicates that 10 points were used for the purchase of two pieces of music on January 16, Heisei 12 and that the balance points changed to 2390; row 680 indicates that 100 points were used for purchasing a map service on January 20, Heisei 12 and that the balance of points changed to 2290; and row 682 indicates that 1000 points were given through point purchase on February 10, Heisei 12 and that the balance of points changed to 3290. The point table is presented to the service user 30 periodically or each time a service is used. Thereby, the service user 30 can identify his or her point status and the balance of points remaining.

Figure 10:
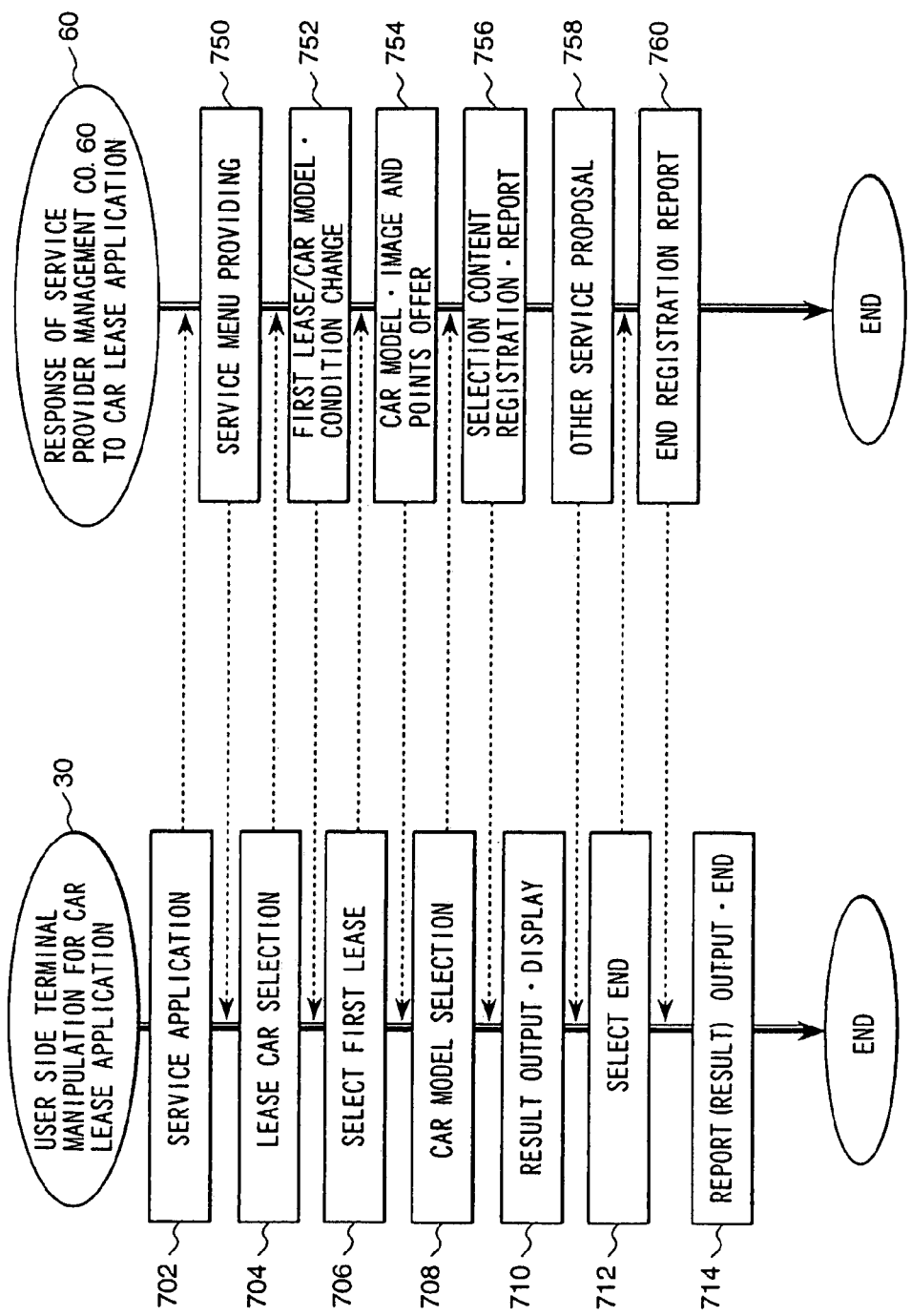
FIG. 10 is a processing flowchart of operations performed with regard to a car use service for a service user in the FIG. 2 embodiment.
Figure 11:
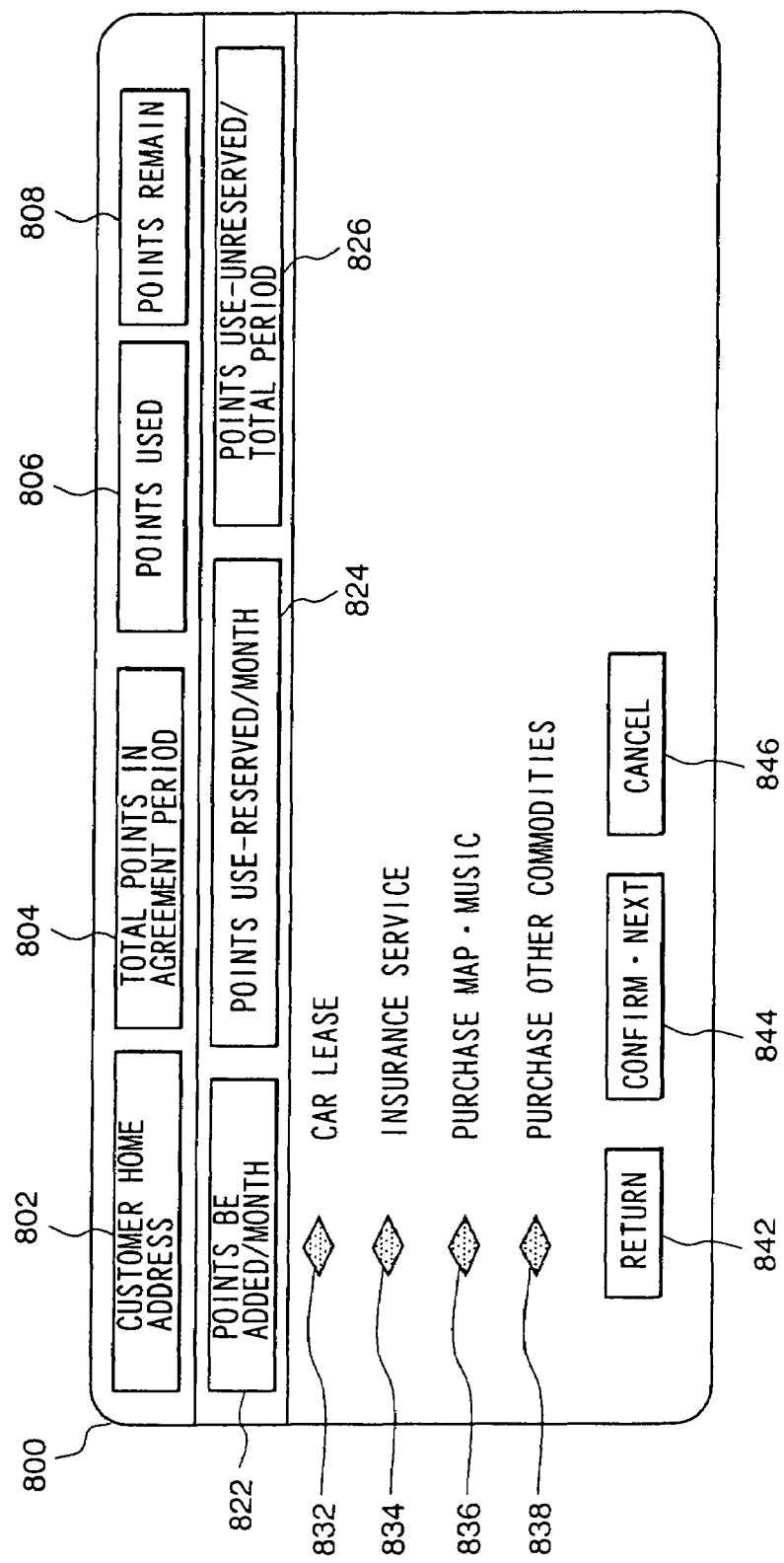
FIG. 11 is a diagram showing a menu for a variety of services in the FIG. 2 embodiment.

A service user 30 can enjoy a variety of advantages by purchasing the car use service. FIG. 10 shows a processing flow with regard to the car use service. In FIG. 10, when the service user 30 applies at step 702 for the service, the service application is received by the service provider management company 60, and, in response thereto, the service provider management company 60 transmits, at step 750, a menu of all of the available services, as illustrated in FIG. 11, to the service user 30. The menu 800 (the image on the display) as illustrated in FIG. 11 includes the customer's name and address (802), total points within the agreement period (804), points used (806), points which remain (808), points to be added/month (822) substantially representing the membership grade, points of use-reserved/month (824), points use-unreserved/month (826), car use service (832), insurance service (834), information purchase services, such as music and map services (836), and other article purchase services (838), each of which can be selected by clicking on the concerned portion through use of a mouse, followed by clicking the confirmation button 844.

Figure 12:
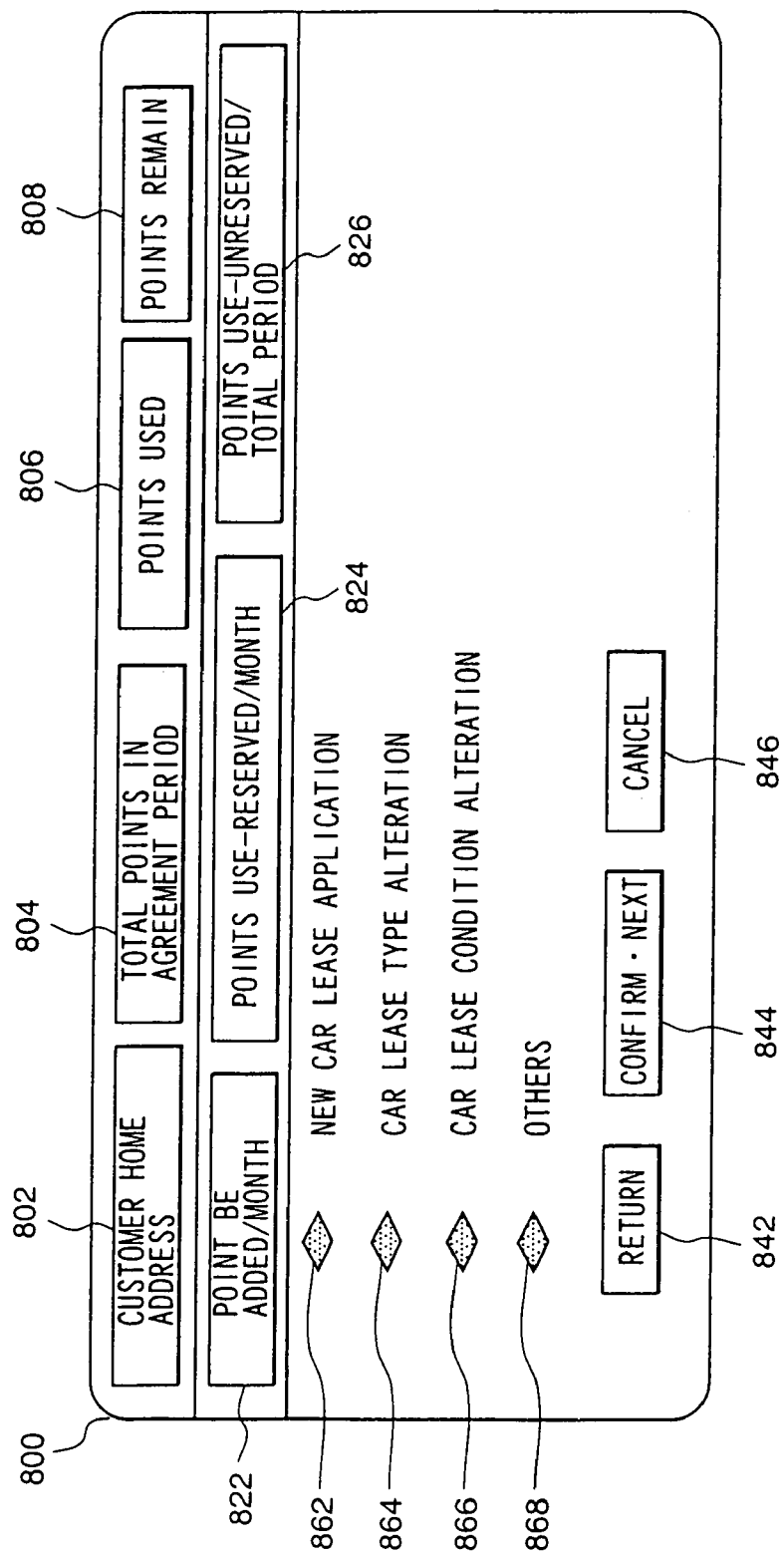
FIG. 12 is a diagram showing a menu for a car use (lease) service in the FIG. 2 embodiment.

For example, when the button 832 for the car use service is selected using the mouse, the items in the menu display, including the car lease service (832), the insurance service (834), the information purchase service (836) and the other article purchase service (838) are partly altered into items including new car lease application (862), car model alteration (864), car lease condition alteration (866) and other (868), as illustrated in FIG. 12. In this instance, when the button 862 for the new car lease application is selected, a list of car manufacturers is displayed, although this is not illustrated; and, when the name of a car manufacturer which the service user 30 wants to select is clicked with the mouse, the desired car manufacturer is selected. When a desired car manufacturer is selected, all models/types of cars provided by the selected car manufacturer are displayed, and, further, the design of each of the car models/types can be recognized on the display through photos (photos taken by a digital camera). When a specific car model/type is selected from the car models/types displayed, a display image for selection of displacement volume, grade and body color is displayed so a to successively select a specific car. Thereafter, another display image appears for selecting car accessories to finally specify a car to be leased. In the display image for selection, when the service user 30 wants to change the selection content (for example, to change a selected red body color to a white body color), a return button 842 is used, and when it is desired to cancel the data now inputted, the cancel button 846 is used.

Figure 14:
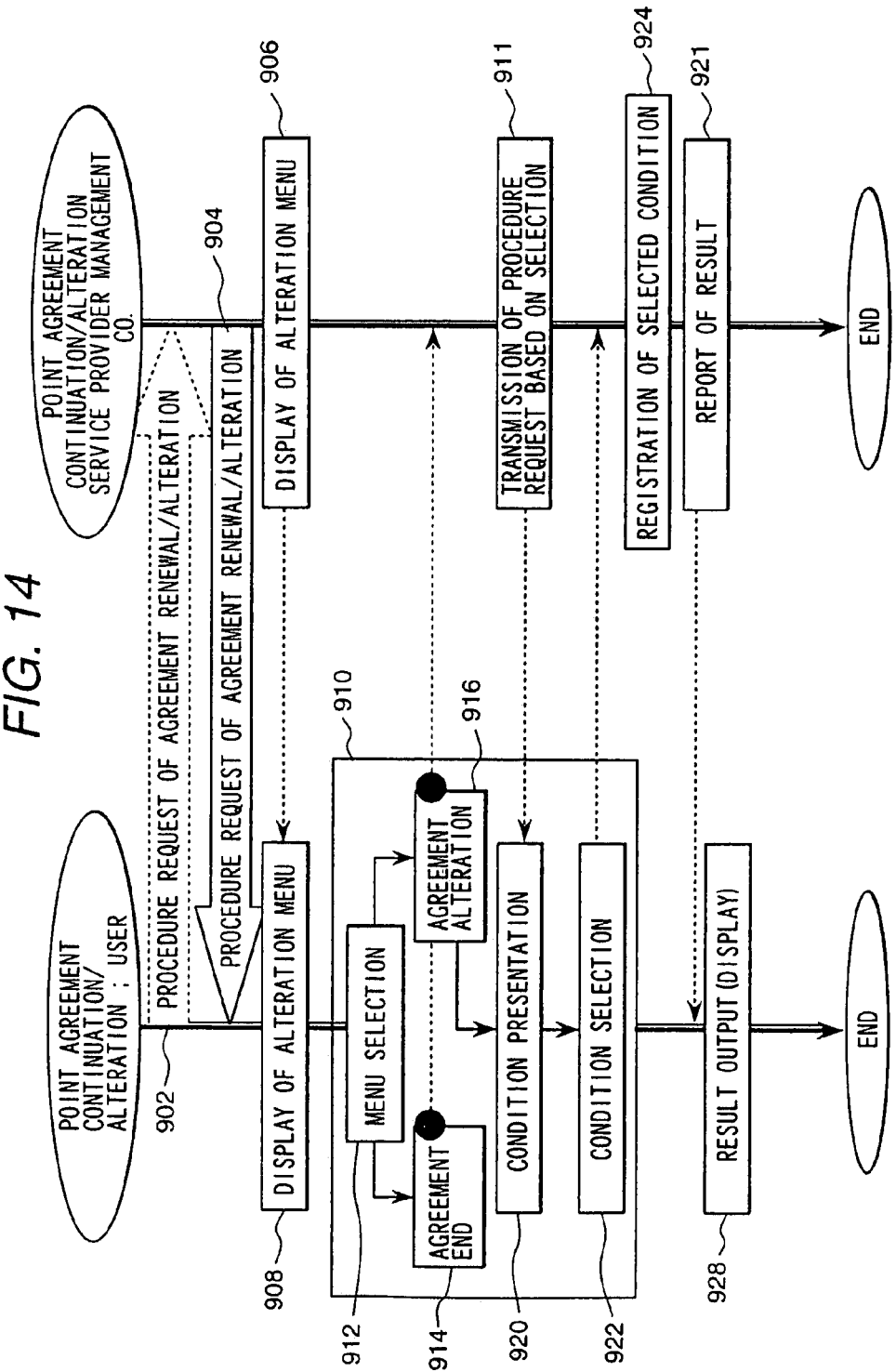
FIG. 14 is a processing flowchart of operations performed with regard to membership continuation of a point agreement in the FIG. 2 embodiment.

FIG. 14 shows a processing flow with regard to agreement continuation or renewal for a registered member (service user 30). In FIG. 14, when the service provider management company 60 requests the service user 30 to specifying agreement renewal/alteration (904), service provider management company 60 performs, at step 906, a menu transmission via the PC 31, the car mounted unit 32, the portable terminal 33 or the car mounted device 40 possessed by the service user 30. The request for agreement renewal/alteration also can be initiated by the service user 30 and sent to the service provider management company 60 via the PC 31, the car mounted unit 32, the portable terminal 33 or the car mounted device 40 possessed by the service user 30 (902).

When the menu transmission from the service provider management company 60 is received, the menu is displayed on the display of the car mounted device 40 of the service user 30 at step 908. When the image display is performed, the service user 30 performs the required processing of step 910. At sub-step 912 in step 910, a menu selection between agreement renewal or agreement termination is performed. During the sub-step 912, a modified menu as shown in FIG. 15 is displayed. The menu (the image on the display) as illustrated in FIG. 15 includes the name and address of the customer (802) to which no change is made, changed total points within the agreement period (952), points used (956), points which remain at the time of termination (956), points be added/month (960) substantially representing the membership grade, points shifted to a subsequent agreement (962) based on points unused, a condition alteration "same amount of payment" (964), a condition alteration "same amount of points" (968), a condition alteration "payment amount alteration" and "point amount alteration" 972, and agreement cancellation (974).

When the menu of the agreement termination processing (974) is selected at sub-step 912, the agreement is terminated at step 914. The agreement termination is communicated to the service provider management company 60.

Further, when agreement renewal is selected from the menu at step 912, a selection is to be made between "same amount of payment" (alteration button 964 has to be clicked), "same amount of points" (alteration button 968 has to be clicked) and "payment amount alteration" and "point" amount alteration" (alteration button 972 has to be clicked).

The selection results at sub-steps 912 and 916 are transmitted to the service provider management company 60, and, in response to the selection result, the service provider management company 60 transmits, at step 911, a request for processing based on the selection result by the service user 30. Namely, when agreement termination (step 912) is selected from the menu, the service user 30 is required to perform a process for terminating the agreement at step 914, and when agreement condition alteration (step 916) is selected from the menu, the service user 30 is required to perform a process for altering the agreement conditions.

The request for proceedings based on the selection result by the service user 30 is transmitted, and, when the service user 30 selects agreement termination from the menu (step 912), the processing for terminating the point agreement is performed at step 914. Further, when the service user 30 selects agreement condition alteration from the menu (step 916), the processing for altering the agreement conditions is started, and conditions therefor are presented from the service provider management company 60. At the time of the condition presentation, if the same condition as the previous agreement is selected, the processing simply performs an agreement renewal. Further, when the conditions of the agreement are presented at step 920, the service user 30 selects at step 922 conditions among the presented conditions applicable to the agreement. When the selection of the agreement conditions is performed, the altered contents are transmitted to the service provider management company 60, and, when the agreement condition contents are received, the service provider management company 60 registers the selected conditions at step 924 and transmits a report indicating that the registration of the agreement condition alteration has been performed according to the selected conditions at step 921. When the transmission is received, the registration result of the agreement condition alteration transmitted from the service provider management company 60 is displayed at step 928.

As has been explained hitherto, according to the service processing system and the processing method of the present invention, services can be more easily provided or offered to service users.

The invention claimed is:

1. A processing system for providing services from a plurality of service providers to a plurality of service users, said processing system comprising:
   a car mounted terminal provided for each service user to permit said service user to input user inputs and to display data;

a service providing management unit, coupled to said car mounted unit by a network, for processing by concluding agreements of service offerings from said service providers to said service users to which offers of services are performed, receiving an application from a service user using said car mounted terminal who desires a service offering, recording necessary personal data of the service user from said car mounted terminal, processing a registration based on said necessary personal data of the service user as payment of desired services, processing of receipt of a lump-sum or periodic use fee from the service user, processing of issuing a point card for the service user in which the personal data of the service user and a point value corresponding to the received use fee are recorded, wherein said service providing management unit comprises:

a car use service management unit for, in response to a car use service application from a service user registered by said service providing management unit, processing by collectively presenting types of cars to said service user, at the same time or after the car type presentation, processing by presenting considerations in point values with regard to a use period for every car type presented to said service user, processing of accepting a car use application in which a car type is specified which the service user desires to use among the presented car types and a use period of the car is selected, processing of requesting a service provider to provide a service in which the type of car is specified and the use period thereof is selected by the service user, processing of receiving a report from the service provider that the car use service has been completed, and processing of deducting the point value corresponding to the offered service from the point value owned by the service user, a car insurance service management unit for, after performing the processing of accepting a car use application in which car type is specified which the service user desires to use among the presented car types and a use period of the car is selected, processing by presenting types, contents and use period of car insurance services with regard to the car selected by the service user, at the same time when or after presenting the types, contents and use period of the car insurance services, processing of presenting considerations in point values of the types, contents and use period of the car insurance services, processing of receiving a use application of car insurance service which is voluntarily selected by the service user regardless of the type and use period of the car which the service user receives as the service offer, processing of requesting the service provider to provide the car insurance service which is selected by the service user, processing of receiving a report from the service provider that the car insurance service has been offered, and processing of deducting a point value corresponding to the offered car insurance service from the point value owned by the service user is performed, and a car other service management unit for, when the service user receives a car use service, processing by presenting different kinds of services other than car use and car insurance services which are available only for the service user receiving car use service by making use of said car mounted terminal of the car now being used, at the same time or after presenting the different kinds of other services, contents thereof and use time thereof, processing of presenting considerations in a form of point value with regard to the kinds of other services, the contents thereof and the use time thereof, processing of receiving a use application of the different kinds of other services and the use time thereof which is set by the service user within the remaining point value of the service user, processing of requesting a service provider to provide another service selected by the service user, processing of receiving a report from the service provider via the car mounted terminal that the other service has been provided, and processing of deducting a point value corresponding to the other service being provided from the point value owned by the service user, wherein said service user is not required to buy and own a car and can freely change the type of car used under the car use service as well as modify the contents of the car insurance service on the car used under the car use service depending on use conditions of the car, wherein during a period when the service user does not use the car, the service user is free to terminate the car insurance service for the period, and wherein when the car insurance service on the car used under the car use service has been terminated by the service user, a remainder of the points credited by a predetermined amount of payment increases and points that will not be used due to the termination of the car insurance service can be freely used for the different kinds of services, managed by said car other service management unit, other than the car use and car insurance services.

2. A processing system for providing services according to claim 1, wherein the kinds of car include a car manufacture, models/type, displacement volume, grade and body color.

3. A processing system for providing services according to claim 1, wherein the use period of the car is a time interval in which the service user occupies and uses the car.

* * * * *